Figure 4:
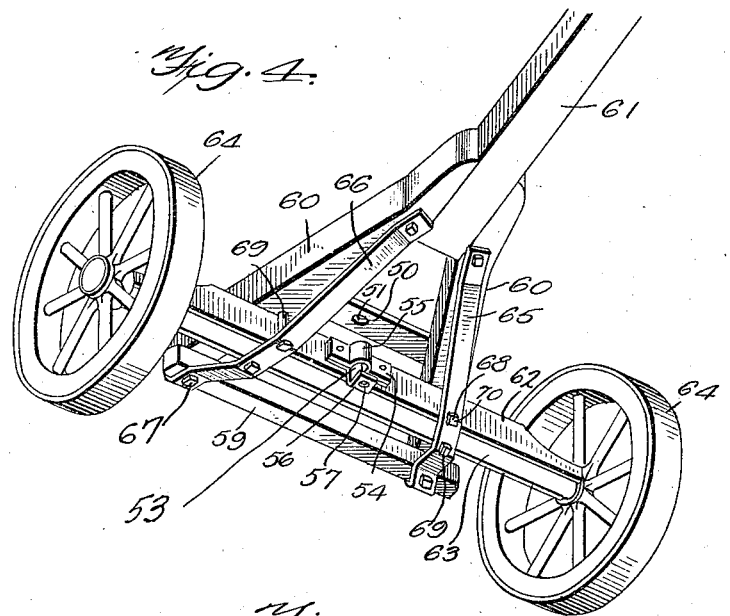

May 27, 1924.
M. L. HALBERT
VEHICLE RUNNING GEAR
Filed May 27, 1920
1,495,556
3 Sheets-Sheet 1
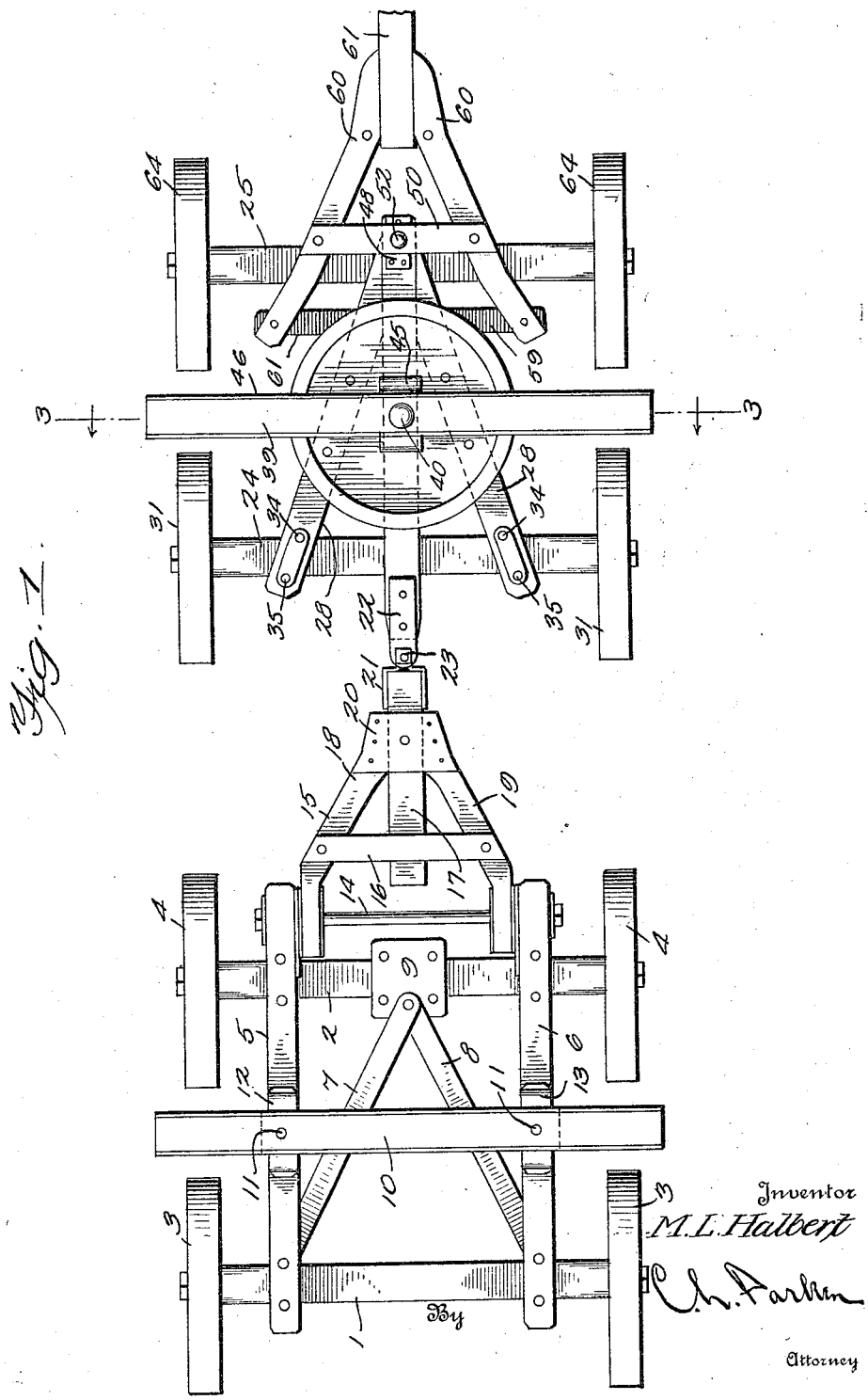

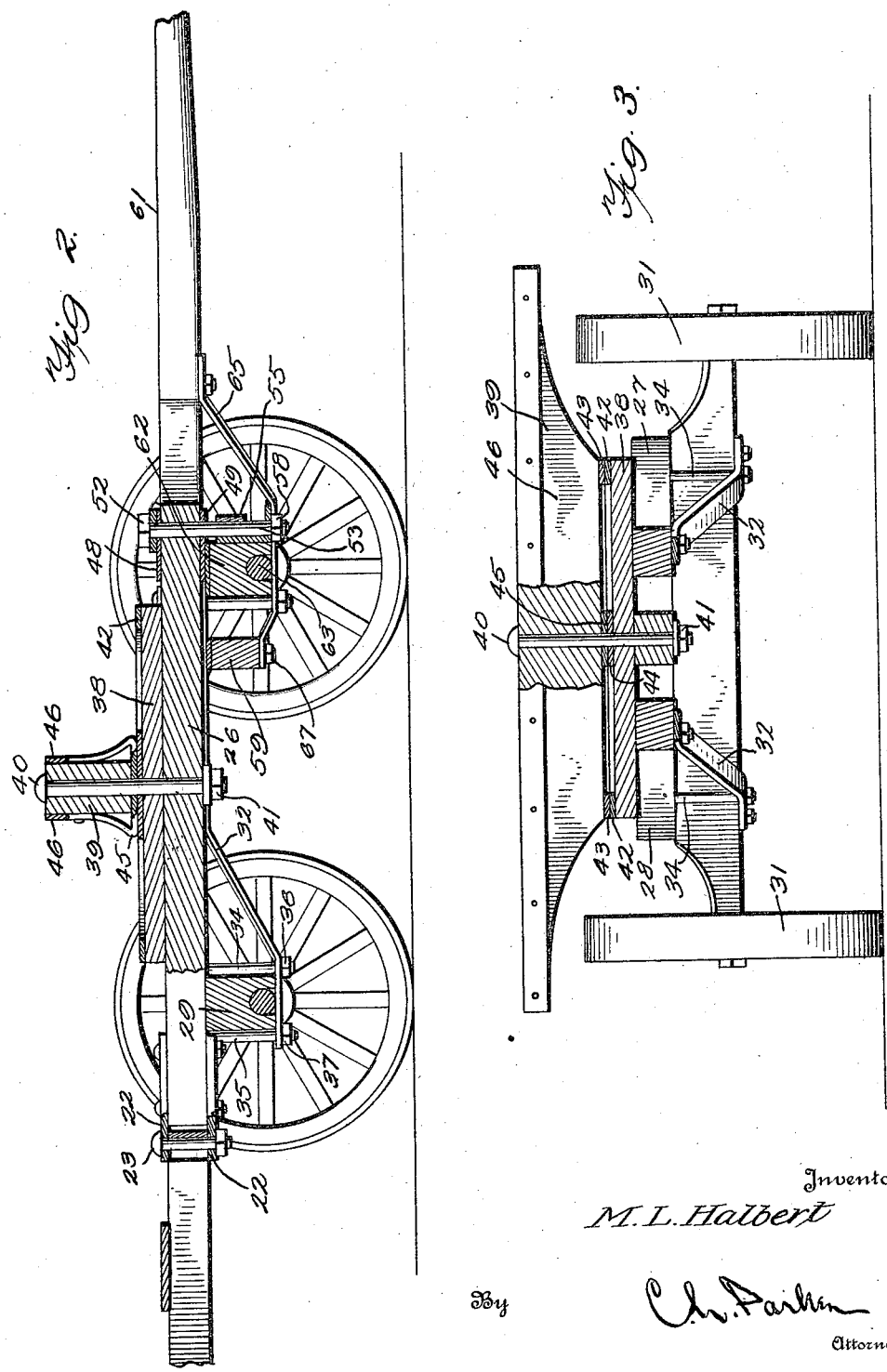

May 27, 1924.

M. L. HALBERT 1,495,556

VEHICLE RUNNING GEAR

Filed May 27, 1920

3 Sheets-Sheet 3

Inventor
M. L. Halbert

By

Attorney

Patented May 27, 1924.

1,495,556

UNITED STATES PATENT OFFICE.

MORTIMER LESTER HALBERT, OF INVERNESS, MISSISSIPPI.

VEHICLE RUNNING GEAR.

Application filed May 27, 1920. Serial No. 384,623.

*To all whom it may concern:*

Be it known that I, MORTIMER L. HALBERT, a citizen of the United States, residing at Inverness, in the county of Sunflower and State of Mississippi, have invented certain new and useful Improvements in Vehicle Running Gears, of which the following is a specification.

This invention relates to vehicle running gears, and it comprises a front and rear truck, the rear truck being best provided with four wheels mounted on a pair of axles, longitudinal connecting beams arranged between the axles, and a bolster carried by said beams; and a front truck, connected to the rear truck to prevent turning movement, the front truck consisting of two axles having wheels, means for connecting said axles to permit independent turning movement, a turn table carried by one axle support and a bolster rotatably mounted thereon; all as more fully hereinafter set forth and as claimed.

The present invention is particularly adapted for use as a log wagon, but any suitable type of body may be mounted on the trucks and the vehicle used for various purposes. In various uses, such as in log wagons, the vehicle is submitted to very rough treatment. At the present time these vehicles are so constructed that the rough treatment incident to their usage quickly breaks the axles and various supporting beams or rods used in the construction. In the present invention, I have produced a vehicle that is particularly adapted for rough usage in which no openings for bolts on other fastening elements are made in the axles, and in which suitable reinforcing means are provided for the various parts.

The running gear is best provided with four front and four rear wheels, the wheels of the front truck being mounted upon independent axles, and the wheels of the rear truck being similarly mounted. A suitable framework is mounted on the sub-truck carrying one of the front axles, and the second sub-truck, similarly constructed, is connected to it to permit relative turning movement. The framework forming one of the sub-trucks is provided with a turn table having an annular metal plate. The king pin passes through the turn table, and through a bolster which is employed to support the front end of the logs when the vehicle is used as a log wagon. When the vehicle is used for any other purpose, a suitable body is secured to the bolster. The under side of the bolster is provided with a pair of metal plates which are adapted to engage the annular metal plate carried by the turn table to produce a very substantial bearing for the body portion of the vehicle.

Figure 5:
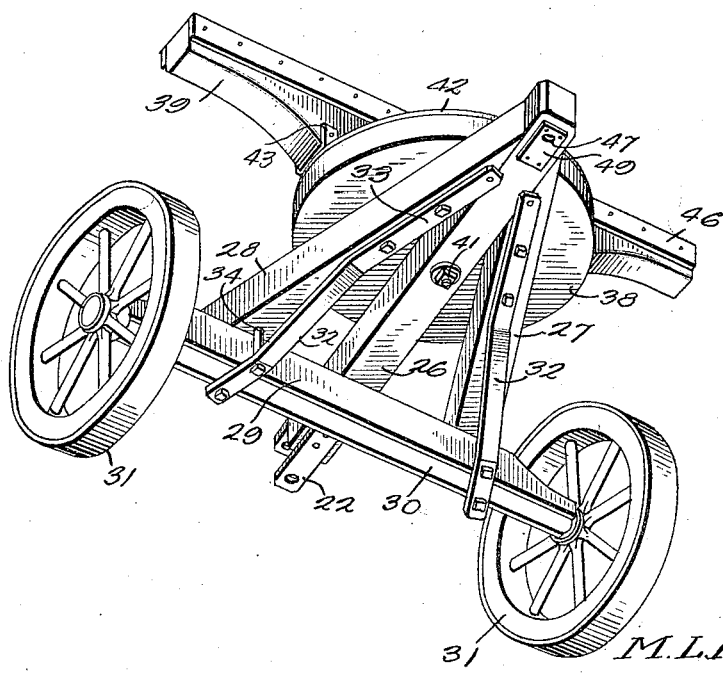

In the accompanying drawings I have shown an advantageous embodiment of this invention. In the drawings, Figure 1 is a plan view of the entire vehicle, Figure 2 is a central vertical longitudinal sectional view of the front truck, Figure 3 is a vertical transverse sectional view on the line 3—3 of Figure 1, Figure 4 is a perspective view of one of the sections of the front truck, and, Figure 5 is a similar view of the other section.

Referring to Figure 1 of the drawings, the rear truck consists of a pair of axle housings 1 and 2 in which are mounted the axles of the four rear wheels. The wheels 3 and 4 of the rear truck are secured to the axles in any suitable manner. The two axles are connected to each other by longitudinal beams 5 and 6 and diagonal bracing members 7 and 8. The axles housing 2 is provided with a metal plate 9 to which the forward ends of the diagonal braces are secured. This arrangement of diagonal braces with the metallic securing plate produces a very substantial construction. A bolster 10 is secured to the longitudinal beams by suitable fastening means, such as bolts 11. When the vehicle is used as a log wagon, the bolster forms the support for the rear end of the logs. When a vehicle body is mounted on the truck, the rear end of the body is secured to the bolster. In order to provide substantial supporting means for the bolster, metal plates 12 and 13 are arranged on the longitudinal beams and the bolster is secured to these metal plates. The ends of the plates may be bent upwardly and secured to the sides of the bolster.

A transverse rod 14 is arranged at the forward end of the longitudinal beams and a connecting framework 15 is pivoted on the rod to permit vertical play between the front and rear trucks. The framework consists of a cross beam 16, a longitudinal beam 17 and a pair of inclined members 18 and 19 secured to the cross beam and to the longitudinal beam. To provide a rigid construction, a metal reinforcing plate 20 is secured to the inclined members and the longitudinal beam. A metal reinforcing plate may also be arranged on the cross beam. Means are provided for connecting the rear truck to the front truck to permit relative turning movement. A metal plate 21 is secured to the longitudinal beam 17 and is arranged to receive a bolt or other fastening element. The rear portion of the front truck is provided with metal plates 22 on its upper and lower sides, and these plates are provided with openings for the passage of a bolt 23 by which the front and rear trucks are pivotally connected. It will be apparent that the bolt is received entirely in metal portions and does not enter or pass through any of the wood work of the vehicle (see Figure 2). The construction produced is very substantial and wear is reduced to a minimum.

The front truck comprises two sections or sub-trucks 24 and 25. The construction of the rear section 24 is shown in detail in Figures 3 and 5. Referring more particularly to these figures, the section comprises a longitudinal beam 26 to which the plates 22 are secured. A pair of diagonal members 27 and 28 are secured to the longitudinal beam. Axle housing 29, is secured to these diagonal members. Axle 30, carrying wheels 31, is arranged in the housing. The axle housing is secured to the beams in such a manner that it is unnecessary to provide openings in the axle or in the axle housing. A pair of metallic supporting and reinforcing strips 32 are secured to the diagonal members 27 and 28 respectively and are bent or offset to extend under the axle housing and hold the axle in place (see Figure 2). Bolts 34 and 35, arranged in openings in the diagonal members, are so positioned that they abut the sides of the axle housing to retain it in position. These bolts pass through openings in the reinforcing and supporting members 32 and are provided with nuts 36 and 37.

To permit relative turning movement between the front truck and the body of the vehicle, a turn table 38 is provided. The turn table comprises a plate of suitable material which is arranged on the section 24 of the front truck. A bolster 39 is arranged over the turn table and the bolster is adapted to form a support for the front end of the logs when the vehicle is used as a log wagon, or for the front end of the vehicle body when a vehicle body is mounted on the trucks. A king pin 40, passing through the bolster and the turn table, is provided with a nut 41 to prevent displacement. Means are provided for furnishing metallic bearing surfaces between the bolster and the turn table to eliminate unnecessary wear.

As shown, the turn table is provided with an annular metalic plate 42 and the bolster is provided with corresponding metallic reinforcements 43 which are secured to the two sides of the bolster (see Figure 5) and extend under it. The turn table is further provided wtih reinforcing means in the nature of a metallic plate 44, which is adapted to engage a metallic plate 45 on the under sides of the bolster, the plate 45 being bent upwardly on each side of the bolster as at 46, and secured thereto.

The front end of section 24 of the truck is provided with means for securing it to the other section 25 to permit relative turning movement of the two sections of the truck. An opening 47 is provided in longitudinal beam 26, and metallic reinforcing plates 48 and 49 are arranged above and below the opening. The section 25 of the truck is provided with a metallic plate 50 having an opening 51 which is adapted to receive a bolt 52 passing through the opening 47 in section 24 of the truck. The connection between the two sections of the truck is further reinforced by the provision of a metal plate 53 secured to a portion of the forward section 25 of the truck, and a second metal plate 54 arranged on the first plate, the second plate being bent or curved as at 55 to receive the bolt 52 (see Figures 2 and 4). The first plate is provided with an extension 56 arranged at right angles to the body portion thereof, and having an opening 57 through which the end of the bolt 52 passes. A nut 58 is provided on the bolt to prevent displacement. It will be seen that the two sections of the truck are connected in such a manner that wear of the parts due to relative movement is reduced to a minimum.

The forward section 25 of the front truck includes a transverse beam 59 to which is secured a pair of diagonal members 60. The usual wagon tongue 61 is secured to the front end of the diagonal members. The metallic bearing plate 50 hereinbefore referred to is also secured to the diagonal members. An axle housing 62 is arranged beneath the diagonal members, the axle housing carrying an axle 63 on which is mounted wheels 64. The axle and axle housing are supported from the truck by supporting means similar to the means employed in connection with the other section of the front truck so as to eliminate the necessity of openings in the axle or axle housing. As shown, a pair of metallic reinforcing and supporting members 65 and 66 are secured to the diagonal members, the reinforcing and supporting members extending downwardly (see Figure 2) and passing beneath the axle housing to retain the axle in position. The rear ends of these members are secured to the transverse beam 59 as at 67. Bolts 68 and 69 are provided in openings in the diagonal members, the bolts extending downwardly in front and back of the axle housing to retain it in position and passing through openings in the reinforcing and supporting members. Nuts 70 may be provided to retain the bolts in position.

It will be apparent that the construction produced is particularly applicable for any sort of work wherein a vehicle is submitted to rough usage. The arrangement of the various connections between the front and rear trucks and between the sections of the front is such that the pivoting pins or bolts are arranged in metal tubes or bearings. Heretofore such pivoting bolts have been passed through the wood work without any reinforcing means and these parts have been the first to become worn. The provision of metallic bearing surfaces between the front bolster 39 and the turn tables 38 is important as it reduces the wear on these parts to a minimum. In ordinary vehicle construction including a wooden turn table and a wooden bolster, the constant engagement of the two parts due to turning of the vehicle results in a very rapid wear and the necessity of frequent repair or replacement.

Although I have shown a described or preferred embodiment of the invention, it is to be understood that various changes in the shape, size and arrangement of parts may be resorted to without departing from the spirit of the invention or the scope of the subjoined claim.

What I claim is:

In a vehicle construction, the combination with a rear truck, of a front truck secured thereto to permit independent turning movement, said front truck comprising two sections secured to each other to permit independent turning movement, a rear section comprising an axle housing, a pair of diagonally disposed hounds secured to said axle housing and extending forwardly, a longitudinal beam arranged between said hounds, the front ends of said hounds being secured to said beam, said beam being provided with an opening adjacent its forward end, a turntable arranged on said truck section, the forward section of said truck comprising an axle housing, the diagonally disposed hounds arranged above said axle housing, a transverse member arranged in the rear of said axle housing and connecting the rear ends of said hounds, a second transverse member arranged forwardly of said axle and connected to said hounds, said transverse member being provided with an opening, and a bolt passing through said opening and the opening in said longitudinal beam to connect said truck sections.

In testimony whereof I affix my signature in presence of two witnesses.

MORTIMER LESTER HALBERT.

Witnesses:
   WM. H. LAVNER,
   J. LIPNICK.